United States Patent
Wetzel

(10) Patent No.: US 8,121,448 B2
(45) Date of Patent: Feb. 21, 2012

(54) ROTARY TRANSFORMER

(75) Inventor: Ulrich Wetzel, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 364 days.

(21) Appl. No.: 12/384,652

(22) Filed: Apr. 7, 2009

(65) Prior Publication Data
US 2009/0257710 A1 Oct. 15, 2009

(30) Foreign Application Priority Data
Apr. 9, 2008 (EP) .................................. 08007048

(51) Int. Cl.
G02B 6/42 (2006.01)
G02B 6/26 (2006.01)
G02B 6/00 (2006.01)

(52) U.S. Cl. .......................................... 385/26; 385/147

(58) Field of Classification Search .................. 385/25, 385/26, 80, 147, 15, 31, 39
See application file for complete search history.

(56) References Cited

U.S. PATENT DOCUMENTS

| | | | | |
|---|---|---|---|---|
| 4,854,662 A * | 8/1989 | Estes et al. | | 385/26 |
| 4,943,137 A * | 7/1990 | Speer | | 385/26 |
| 5,010,254 A | 4/1991 | Moore | | |
| 5,991,478 A * | 11/1999 | Lewis et al. | | 385/26 |
| 6,385,367 B1 * | 5/2002 | Rogers et al. | | 385/26 |
| 6,434,293 B1 * | 8/2002 | Igeta et al. | | 385/25 |
| 6,937,787 B2 * | 8/2005 | Schilling et al. | | 385/26 |
| 6,980,714 B2 * | 12/2005 | Lo et al. | | 385/26 |
| 7,248,761 B2 * | 7/2007 | Schilling et al. | | 385/25 |
| 7,352,929 B2 * | 4/2008 | Hagen et al. | | 385/25 |
| 7,433,556 B1 * | 10/2008 | Popp | | 385/26 |
| 7,526,155 B2 * | 4/2009 | Hirohashi et al. | | 385/26 |
| 7,660,497 B2 * | 2/2010 | Happel et al. | | 385/25 |
| 2004/0086222 A1 * | 5/2004 | Bowman | | 385/26 |
| 2004/0141686 A1 * | 7/2004 | Schilling et al. | | 385/26 |
| 2005/0013535 A1 * | 1/2005 | Popescu | | 385/26 |
| 2009/0154875 A1 * | 6/2009 | Schmidt et al. | | 385/26 |
| 2009/0232448 A1 * | 9/2009 | Barmash et al. | | 385/26 |

FOREIGN PATENT DOCUMENTS

| | | |
|---|---|---|
| EP | 1 178 338 A2 | 2/2002 |
| GB | 1587531 A1 | 4/1981 |
| JP | 57138228 A | 8/1982 |
| JP | 02083506 A | 3/1990 |
| WO | WO 99/18463 A1 | 4/1999 |
| WO | WO 2005/015788 A1 | 2/2005 |
| WO | WO/2008/058825 | 10/2007 |

OTHER PUBLICATIONS

Communication/Office Action from Japanese Patent office citing references, Jul. 29, 2011, pp. 1-2.

* cited by examiner

Primary Examiner — Akm Ullah

(57) ABSTRACT

A rotary transformer having first light-conducting curved tube segments, the first tube segments being disposed to form a first tubular arrangement, is disclosed. The rotary transformer has at least one first transmitter for producing first light signals and at least one first receiver for receiving the first light signals. The first light signals are transmitted from the first transmitter via the first tube segments to the first receiver.

20 Claims, 6 Drawing Sheets

ROTARY TRANSFORMER

CROSS REFERENCE TO RELATED APPLICATIONS

This application claims priority of European Patent Application No. 08007048.5 EP filed Apr. 9, 2008, which is incorporated by reference herein in its entirety.

FIELD OF INVENTION

The invention relates to a rotary transformer.

BACKGROUND OF INVENTION

Rotary transformers are used to transmit data from a rotating object, such as a shaft for example, to a stationary object, such as a control assembly located in a control cabinet.

In the case of standard commercial rotary transformers the data is transmitted by means of slip rings for example.

Rotary transformers are also known, in which data is transmitted from the rotating to the stationary part by means of optical signal transmission. A transmitter disposed in the axial rotation center of the shaft transmits a light signal to a stationary receiver that is likewise disposed in an axially central manner. However such an optical rotary transformer with a standard commercial configuration is not suitable for transmitting signals if the shaft is configured as a hollow shaft, since the transmitter cannot be positioned in the axial rotation center of the shaft but must be positioned on the hollow shaft away from the rotation center, so that data can only be transmitted when the shaft and therefore the transmitter reach a specific angular position, so that transmission to the receiver, which is likewise disposed away from the rotation center, is possible. When using an individual transmitter and an individual receiver it is then generally only possible to transmit data just once per rotation of the shaft, the shaft reaching a specific angular position, specifically when the transmitter and receiver are axially opposite one another, so that the light beam emitted by the transmitter can be received by the receiver.

In the PCT application reference PCT/EP2007/061183 a rotary transformer is described, in which electrical signals are converted to optical signals and transmitted by way of a light-conducting hollow body, which is present in the form of a tube. This allows a rotation gap to be bridged optically. Using light-conducting tubes allows passage of a shaft in the central rotation axis of the rotary transformer, so that the rotary transformer can be positioned in any position on the shaft, since the shaft can be guided through the rotary transformer. So that a receiver at the end of the tube can receive the light signals reliably at any rotation angle, the light must be distributed regularly over the end face of the tube. The tube must therefore have a specific minimum length, as the light cones propagated as a function of the emission angle of the light coupling points should fill all the light-free voids as far as possible. The larger the diameter of the tube, the longer it must be for the light cones leaving the light coupling points to touch one another or to overlay one another to the greatest possible degree. A large number of light coupling points are therefore required to ensure an acceptable tube length even in the case of large tube diameters (larger than approx. 400 mm).

Also the manufacture of a light-conducting tube with a large diameter is very complex. The tubes are generally made of a light-permeable plastic (PMMA) or glass. Therefore to manufacture light-conducting tubes of large diameter (larger than approx. 400 mm), expensive injection molding materials have to be produced. It is also extremely difficult from a manufacturing point of view to produce the necessary thin tubes with a large diameter in this manner. To keep coupling and decoupling losses low the wall thickness of the tubes must be tailored to the diameter of the transmit and/or receiver coupling points. However these are generally only a few millimeters. This is not technically feasible for large-diameter tubes and high coupling and decoupling losses therefore result. The use of light-conducting tubes for optical signal transmission for rotating shafts exceeding a diameter of 400 mm is therefore only technically possible with very high manufacturing outlay and is associated with high coupling and decoupling losses. A large-diameter shaft here is understood to be a shaft with a diameter larger than 400 mm.

A rotary transformer is known from GB 1587531, in which light-conducting fibers are disposed to form a hollow body. Such a procedure is however not technically feasible in practice for large-diameter shafts, for example because of the large number of fibers and the optical connection technology required for the purpose.

SUMMARY OF INVENTION

An object of the invention is to create a rotary transformer, which allows an optical signal transmission for a rotating shaft with a large diameter and can be positioned in any position along the shaft.

This object is achieved by a rotary transformer, in which the rotary transformer has first light-conducting curved tube segments, the first tube segments being disposed to form a first tubular arrangement, the rotary transformer having at least one first transmitter for producing first light signals and at least one first receiver for receiving the first light signals, it being possible for the first light signals to be transmitted from the first transmitter by way of the first tube segments to the first receiver.

Advantageous embodiments of the invention will emerge from the dependent claims.

It proves advantageous for the rotary transformer to have second light-conducting curved tube segments, the second tube segments being disposed to form a second tubular arrangement, with the first tube segments and the second tube segments being disposed coaxially and in such a manner that they can be rotated in relation to one another, it being possible for the first light signals to be transmitted from the first transmitter by way of the first and second tube segments to the first receiver, with the rotary transformer having at least one second transmitter for producing second light signals and at least one second receiver for receiving second light signals, it being possible for the second light signals to be transmitted from the second transmitter by way of the second and first tube segments to the second receiver. This allows bidirectional transmission.

It also proves advantageous for the first transmitter to be connected, at least at some of the first tube segments, by way of a number of first optical waveguides for transmitting the first light signals to the end faces of the first tube segments facing the first transmitter. This allows light signals to be fed into a number of the tube segments or into all the tube segments by way of a common transmitter.

It also proves advantageous for the first optical waveguides to be connected to the first tube segments at the center of the respective end face. This ensures optimal regular propagation of the light signals in the tube segments.

It also proves advantageous for the second transmitter to be connected, at least at some of the second tube segments, by way of a number of second optical waveguides for transmitting the second light signals to the end faces of the second tube segments facing the second transmitter. This allows light signals to be fed into a number of the tube segments or into all the tube segments of one side of the rotary transformer by way of a common transmitter.

It also proves advantageous for the second optical waveguides to be connected to the second tube segments at the center of the respective end face. This ensures optimal regular propagation of the light signals in the tube segments.

It also proves advantageous for the rotary transformer to have a number of first transmitters for producing first light signals, the first transmitters being disposed in such a manner that the first light signals are fed into the end faces of the first tube segments facing the first transmitters. Using a number of transmitters allows particularly strong light signals to be produced, thereby increasing transmission reliability.

It also proves advantageous for the first light signals to be fed in at the center of the end faces of the first tube segments facing the first transmitters. This ensures optimal regular propagation of the light signals in the tube segments.

It also proves advantageous for the rotary transformer to have a number of second transmitters for producing second light signals, the second transmitters being disposed in such a manner that the second light signals are fed into the end faces of the second tube segments facing the second transmitters. Using a number of transmitters allows particularly strong light signals to be produced, thereby increasing transmission reliability.

It also proves advantageous for the second light signals to be fed in at the center of the end faces of the second tube segments facing the second transmitters. This ensures optimal regular propagation of the light signals in the tube segments.

It also proves advantageous for the first receiver to be connected by way of a fiber splitter to at least two adjacently disposed first tube segments. Using a receiver-side splitter allows reliable receiving to be ensured in any rotational position, even if the light signals are distributed in an irregular manner over the receiver-side end faces of the tube segments with the result that the signal strength of the light signals is not homogenous along the end faces.

It also proves advantageous for the second receiver to be connected by way of a light-conducting splitter to the end faces of at least two adjacently disposed second tube segments facing the receiver. Using a receiver-side splitter allows reliable receiving to be ensured in any rotational position, even if the light signals are distributed in an irregular manner over the receiver-side end faces of the tube segments with the result that the signal strength of the light signals is not homogenous along the end faces.

It also proves advantageous for the first receiver to be disposed in the region around the center of the end face of one of the first tube segments and/or the second receiver to be disposed in the region around the center of the end face of one of the second tube segments. With the bidirectional embodiment it is advantageous to dispose the receiver on each side as far as possible at the center of the end face of the respective tube segment, in order to ensure reliable receiving even if the receiver-side end face of the respective tube segment is illuminated irregularly.

It also proves advantageous for the first and/or second tube segments to have a thin wall thickness, since this offers good light conductivity and the light signals are coupled and decoupled with only small losses.

BRIEF DESCRIPTION OF THE DRAWINGS

Two exemplary embodiments of the invention are illustrated in the drawing and described in more detail below. In the drawing.

DETAILED DESCRIPTION OF INVENTION

Optical transmission takes place by means of tube segments. The tube segments are simple and economical to manufacture and their optical properties can be easily controlled due to their spatial geometry.

Figure 1:
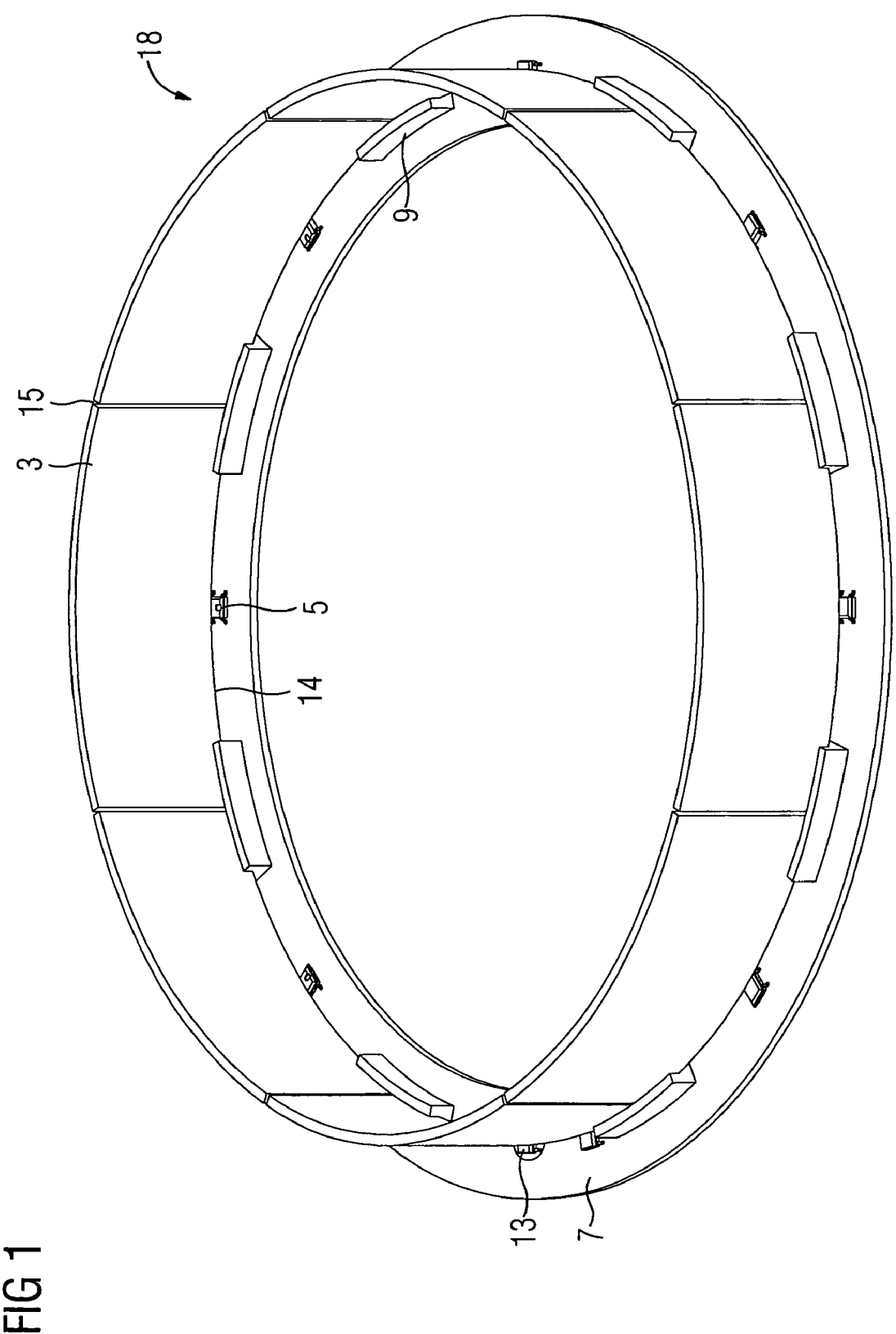
FIG. 1 shows a tubular arrangement of light-conducting curved tube segments.

FIG. 1 shows a tubular arrangement 18 made up of first tube segments. For the sake of clarity only a first tube segment 3 is assigned a reference character. The tube segments have a curved spatial geometry, it being possible for the tube segments to be put together approximately to form a tube, taking into account the resulting gaps. The tube segments are configured as preferably rectangular elements curved in space. This makes it possible to realize the tubular arrangement with only a few tube elements (e.g. from 3 to 30 tube elements) even for a large-diameter shaft and thus to allow optical transmission even with large-diameter shafts. The tube segments in the context of the exemplary embodiment are thin, in other words the wall thickness of the tube segments is small compared with their height H and width B. The wall thickness is generally only a few millimeters (e.g. less than 10 millimeters), so that the light signals can be coupled and decoupled with a high level of efficiency and conduct the light effectively. The individual tube segments are separated from one another by a gap 15, in particular an air gap, with only one gap 15 being assigned a reference character for the sake of clarity in FIG. 1. The first tube segments are connected to one another and to a first printed circuit board 7 by way of bracing elements. For the sake of clarity only one bracing element 9 is assigned a reference character. The first tube segments are thus disposed by means of the bracing elements to form a light-conducting tubular arrangement 18. First transmitters are disposed on the first printed circuit board 7 to produce light signals, the first transmitters being disposed in such a manner that light signals are fed into the end faces of the first tube segments facing the first transmitters. In FIG. 1 for the sake of clarity only a first transmitter 5 and the end face 14 of a first tube segment facing the first transmitter 5 are assigned a reference character. In the case of a bipolar transmission a second receiver 13 is also disposed on the first printed circuit board 7 in the region around the center of the end face of one of the first tube segments. In the case of a unidirectional transmission the second receiver 13 is not present.

Figure 2:
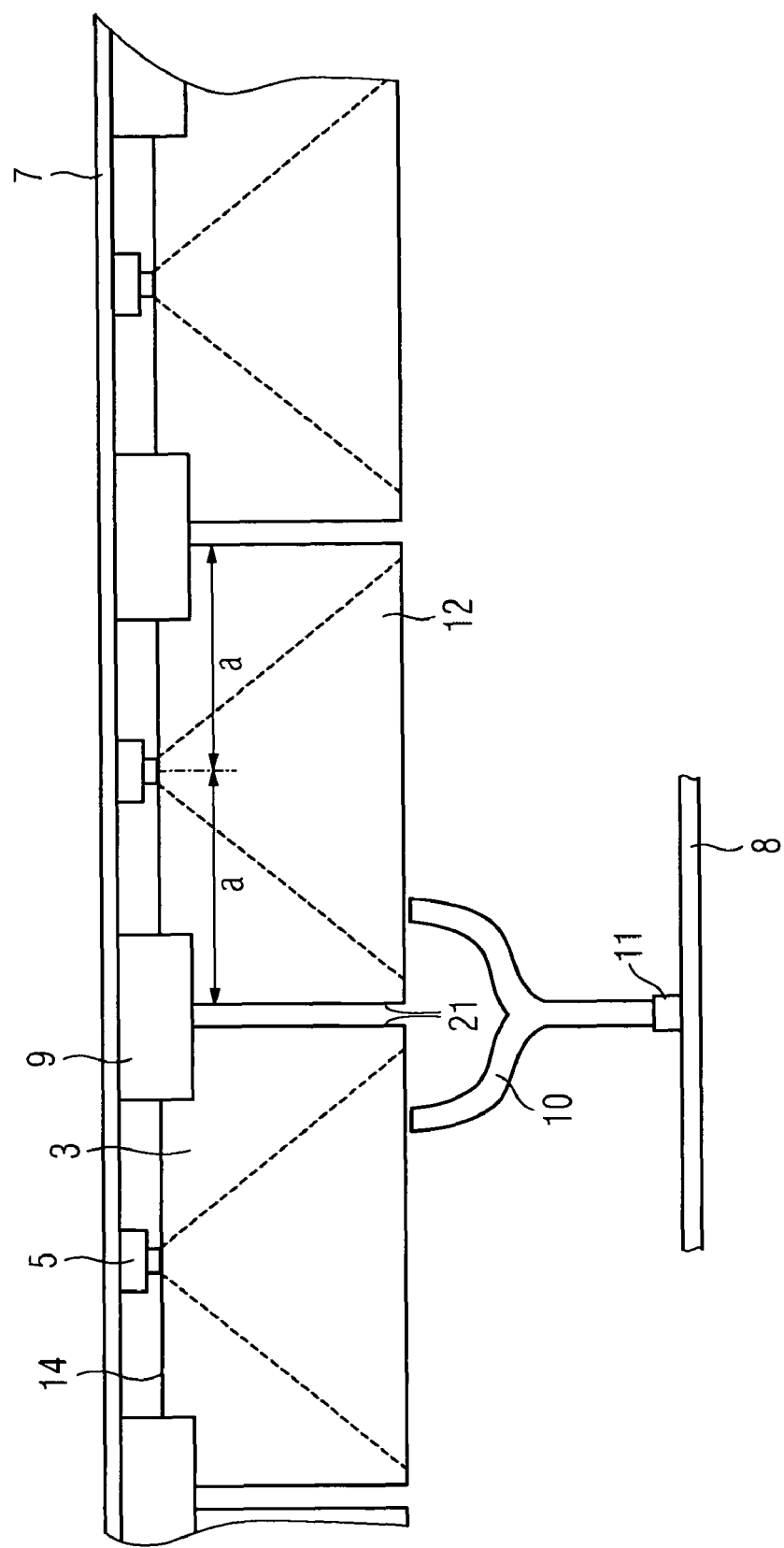
FIG. 2 shows a first exemplary embodiment of the invention for a unidirectional transmission.

FIG. 2 shows the principle of transmission for a unidirectional data transmission in the form of a schematic diagram. Identical elements are provided with the same reference characters as in FIG. 1. FIG. 2 shows a section of the tubular arrangement according to FIG. 1 projected onto a surface.

A first transmitter is assigned to each first tube segment with only a first transmitter 5 and a first tube segment 3 being assigned reference characters for the sake of clarity. The light is fed into the individual first tube segments by way of a first transmitter assigned to each first tube segment, said first transmitter being preferably disposed, as shown in FIG. 2, at the center of the end face of the respective first tube segment facing the transmitter (see distance a). This ensures regular illumination of the end faces of the first tube segments on the receiver side.

A region 12 of the illumination in which the light signals are transmitted is shown as an example with a broken line in FIG. 2. On the other side of the rotary transformer a first receiver 11 is disposed on a second printed circuit board 8. The receiver 11 is used to receive the light signals produced by the first transmitters. Ideally the spatial dimensions of the tube segments here are selected so that the end faces of the tube segments are illuminated completely on the receiver side. In practice however this is frequently not possible, for example for structural reasons. In practice, as shown in FIG. 2, the region of illumination 12 can be somewhat smaller for example than the length of the end faces of the first tube segments or reflections occur at the lateral peripheral regions 21 of the first tube segments, when the width of the illumination of the first tube segments is selected appropriately. This means that the strength of the light signals is no longer homogeneous at the receiver-side end faces of the tube segments and in particular is frequently lower in the peripheral regions. In order still to ensure effective and reliable transmission, the first receiver can either be correspondingly large so that it captures the illumination region of two adjacent tube segments at the same time or, as shown in FIG. 2, a standard commercial first receiver 11 can be used, with the first receiver 11 receiving the light signals by way of a splitter 10, which in the exemplary embodiment is configured as a fiber splitter, from two adjacent first tube segments. The two open ends of the fiber splitter are disposed in such a manner here that they lie in a region in which reliable illumination is ensured for the two adjacent tube segments. The light signals can also optionally be decoupled from more than two adjacent tube segments by way of a splitter split into three parts for example and be conducted to the first receiver 11. It should be noted here that in the context of the exemplary embodiment the second printed circuit board 8, the first receiver 11 and the fiber splitter 10 form the stator, which remains in a fixed position and the first transmitters, the first printed circuit board 7, the bracing elements and the tube segments form the rotor, which rotates with the shaft. This does not necessarily have to be the case however; it can also be the other way round.

Figure 3:
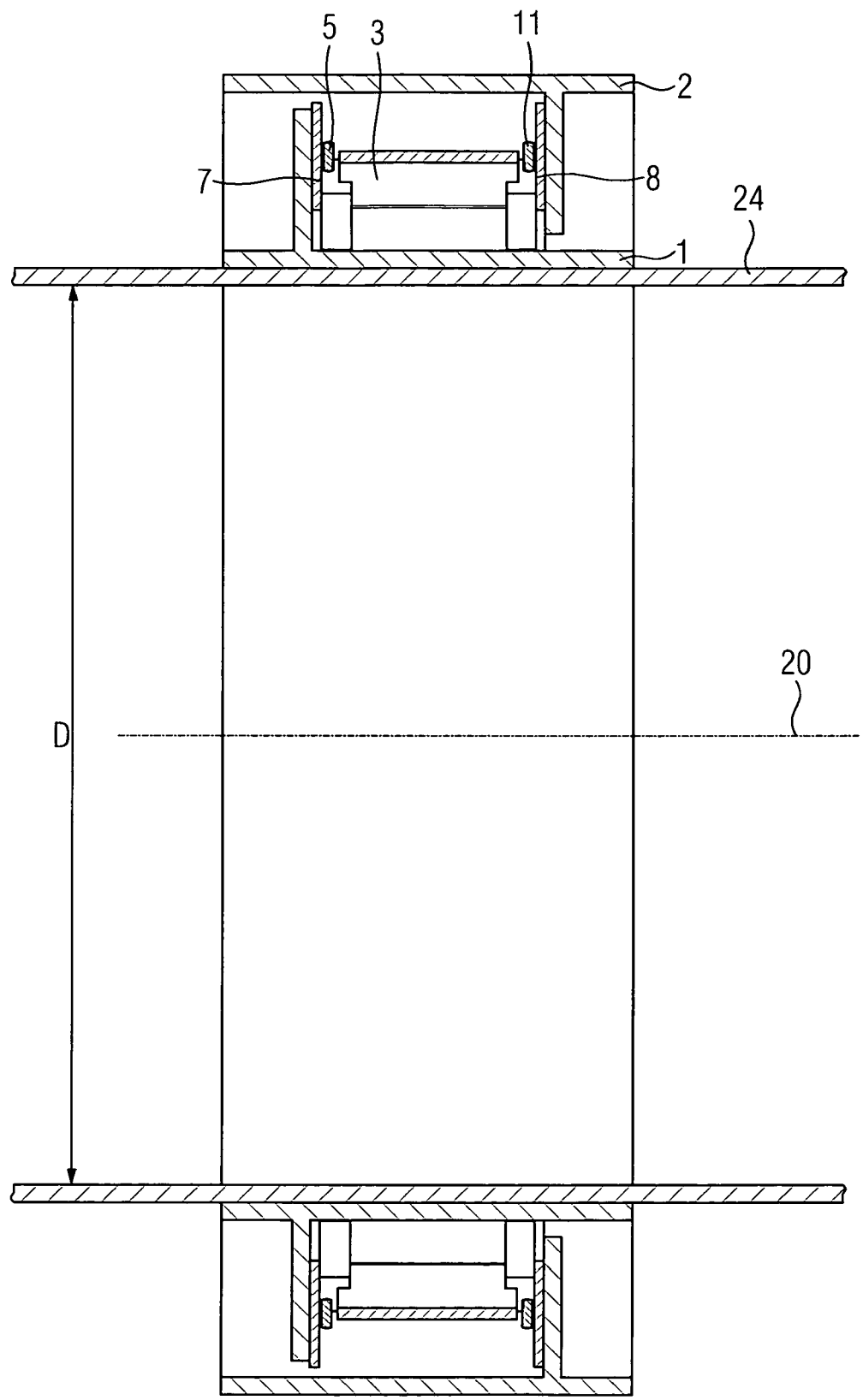
FIG. 3 shows a sectional view of a rotary transformer for a unidirectional data transmission.

FIG. 3 shows a schematic sectional drawing of the rotary transformer in the case of a unidirectional transmission. FIG. 3 has the same reference characters as FIG. 1 and FIG. 2. The rotary transformer here has a rotationally symmetrical internal housing 1, on which the first printed circuit board 7 is disposed. The rotary transformer also has a stationary external housing 2, on which the second printed circuit board 8 is disposed. The rotation axis of the rotary transformer here is assigned the reference character 20. The internal housing 1 is connected in a rotationally fixed manner to the shaft 24 during operation. The shaft is passed through the rotary transformer, the shaft having a diameter D. The rotary transformer can thus be positioned in any position along the shaft. It should be noted here that for the sake of clarity only the components of significance for an understanding of the invention are shown in the figures.

Figure 4:
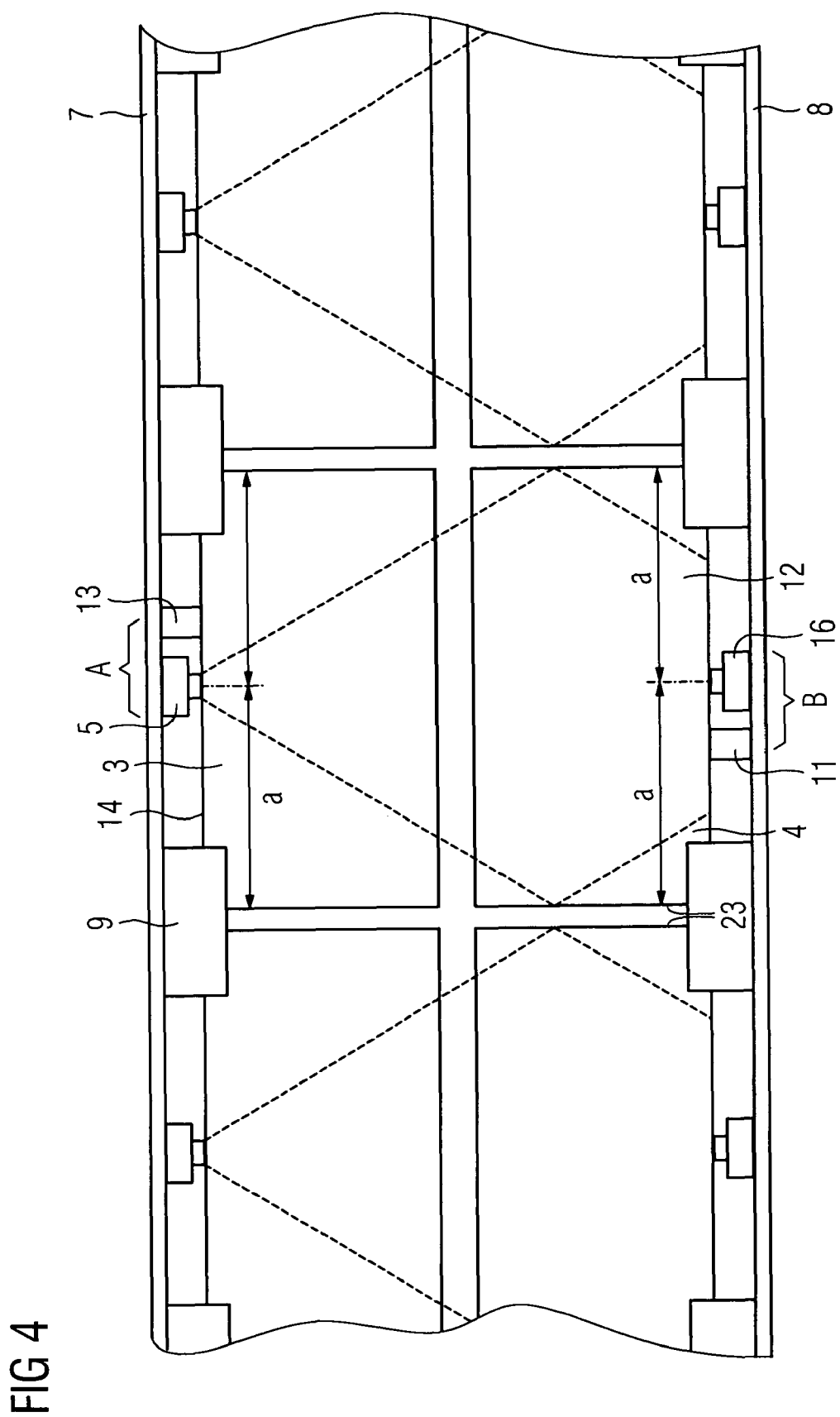
FIG. 4 shows an exemplary embodiment of the rotary transformer for a bidirectional data transmission.

FIG. 4 shows an embodiment of the rotary transformer for a bidirectional transmission.

To realize a bidirectional transmission the first tubular arrangement of tube segments described in FIG. 1 together with the transmitters and receivers is required twofold. The rotary transformer therefore has second light-conducting curved tube segments with only one second tube segment 4 being assigned a reference character for the sake of clarity. The second tube segments here are disposed correspondingly, as described in FIG. 1, to form a second tubular arrangement and are configured in an identical manner to FIG. 1. The first tube segments and the second tube segments are disposed coaxially and in such a manner that they can be rotated in relation to one another. The first light signals are transmitted from the first transmitters (only one first transmitter 5 is assigned a reference character) by way of the first and second tube segments to the first receiver 1. For transmission in the counter direction the rotary transformer has second transmitters, with only one second transmitter 16 in FIG. 4 being assigned a reference character for the sake of clarity. The second transmitters produce second light signals. The rotary transformer also has a second receiver 13 for receiving the second light signals. The second light signals here are transmitted from the second transmitters by way of the second and first tube segments to the second receiver 13.

The illumination region of the tube segments in the case of a light signal transmission from the first transmitters to the first receiver 11 is shown in FIG. 4. As already described correspondingly in FIG. 2, it can also happen with the bidirectional embodiment that reflections occur at the tube segments in the lateral regions 23, resulting in poorer illumination of the receiver-side end face of the tube segments in the peripheral regions. To ensure a very high level of transmission reliability, it is therefore advantageous to dispose the first receiver 11 in the region around the center of the end face of one of the first tube segments and the second receiver 13 in the region around the center of the end face of one of the second tube segments. The receivers are thus disposed in proximity to a transmitter.

Figure 5:
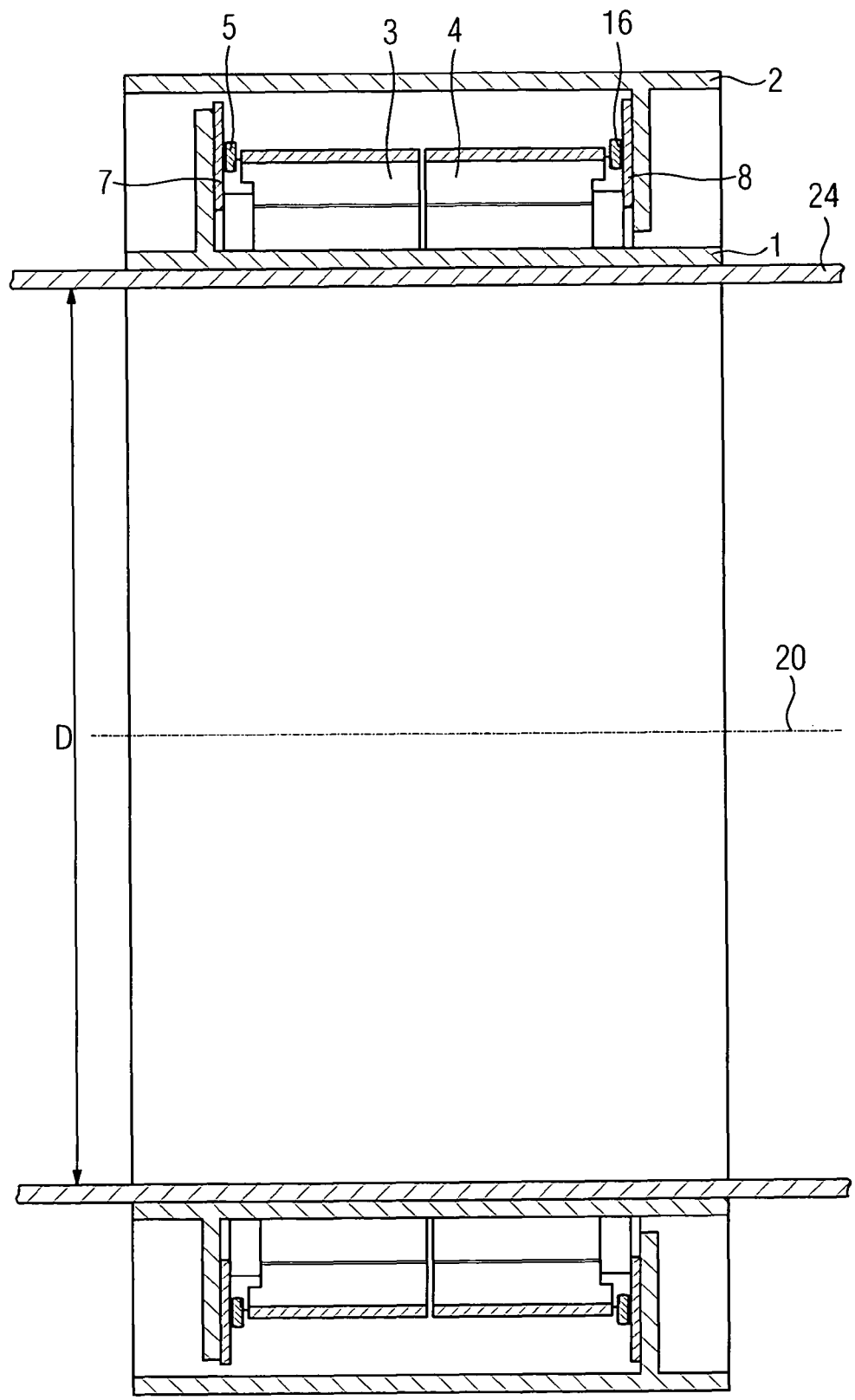
FIG. 5 shows a sectional view of the rotary transformer for a bidirectional data transmission and FIG. 6 shows an example of the coupling of a transmitter to a number of tube elements by way of optical waveguides.

FIG. 5 shows a schematic sectional diagram of the rotary transformer in the case of the bidirectional transmission. Identical elements here are assigned the same reference characters as in FIG. 4 and FIG. 3. In the exemplary embodiment according to FIG. 5 the first tube segments rotate with the internal housing 1 and the shaft 24, while the second tube segments form the stator together with the external housing 2 and the second transmitter 16 and are disposed in a fixed position.

Figure 6:
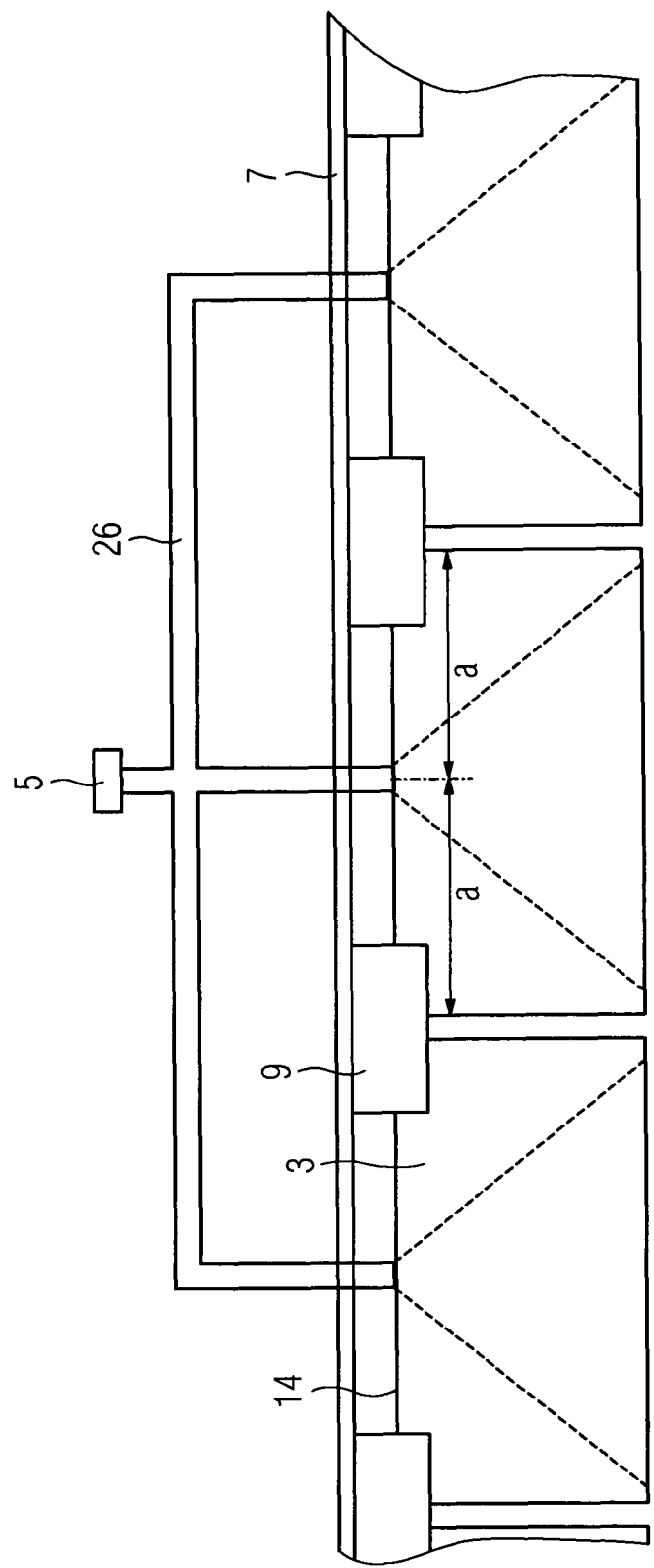

In the embodiments of the invention according to FIG. 1 to FIG. 5 each tube segment is irradiated by a transmitter assigned to it and the light signals are thus fed into the tube segments. This has the disadvantage that a relatively large number of transmitters are required. To save transmitters, in an extreme instance only a single first transmitter 5 may be present, as in the embodiment shown schematically in FIG. 6, with the light signals produced by the first transmitter 5 being fed into the first tube segments by way of a number of first optical waveguides 26. The first transmitter 5 is connected for this purpose by way of a number of first optical waveguides 26 for transmitting the first light signals to the end faces of the first tube segments facing the first transmitter. To ensure homogenous symmetrical illumination of the tube segments, it is advantageous here to connect the first optical waveguides to the first tube segments at the center of the respective end faces, as shown in FIG. 6. If transmission strength is inadequate when using only one transmitter, it is also possible to use two or more first transmitters and these are then connected by way of a number of first optical waveguides to the first tube segments. The first transmitter is thus connected, at least at some (not necessarily all) of the first tube segments by way of a number of first optical waveguides for transmitting the first signals to the end faces of the first tube segments facing the first transmitter.

As with the embodiment of the invention with a number of first optical waveguides 26 described in relation to the first tube segments in FIG. 6, feeding in can also take place by means of a number of second optical waveguides by way of one or more second transmitters in respect of the second tube segments.

It should be noted here that the invention can also be used for shafts with a diameter of less than or equal to 400 mm.

The invention claimed is:

1. A rotary transformer, comprising:
 first light-conducting curved tube segments, the first tube segments being disposed to form a first tubular arrangement;
 a first transmitter configured to produce first light signals; and
 a first receiver configured to receive the first light signals,
 wherein the rotary transformer is configured to transmit first light signals from the first transmitter through the first tube segments to the first receiver.

2. The rotary transformer as claimed in claim 1, further comprising:
 second light-conducting curved tube segments, the second tube segments being disposed to form a second tubular arrangement, the first tube segments and the second tube segments being disposed coaxially and such that they rotate in relation to one another, the first light signals being transmitted from the first transmitter via the first and second tube segments to the first receiver;
 a second transmitter configured to produce second light signals; and
 a second receiver configured to receive second light signals,
 wherein the second light signals are transmitted from the second transmitter via the second and first tube segments to the second receiver.

3. The rotary transformer as claimed in claim 1, further comprising:
 a plurality of first optical waveguides, wherein the first transmitter is connected to at least some of the first tube segments by way of the plurality of first optical waveguides, the optical waveguides being configured to transmit the first signals to end faces of the first tube segments facing the first transmitter.

4. The rotary transformer as claimed in claim 2, further comprising:
 a plurality of first optical waveguides, wherein the first transmitter is connected to at least some of the first tube segments by way of the plurality of first optical waveguides, the first optical waveguides being configured to transmit the first signals to end faces of the first tube segments facing the first transmitter.

5. The rotary transformer as claimed in claim 3, wherein the first optical waveguides are connected to the first tube segments at a center of the respective end face.

6. The rotary transformer as claimed in claim 4, wherein the first optical waveguides are connected to the first tube segments at a center of the respective end face.

7. The rotary transformer as claimed in claim 2, further comprising:
 a plurality of second optical waveguides, wherein the second transmitter is connected to at least some of the second tube segments by way of the plurality of second optical waveguides, the second optical waveguides configured to transmit the second light signals to end faces of the second tube segments facing the second transmitter.

8. The rotary transformer as claimed in claim 7, wherein the second optical waveguides are connected to the second tube segments at a center of the respective end face.

9. The rotary transformer as claimed in claim 1, wherein the rotary transformer has a plurality of first transmitters configured to produce first light signals, the first transmitters being disposed such that the first light signals are fed into end faces of the first tube segments facing the first transmitters.

10. The rotary transformer as claimed in claim 2, wherein the rotary transformer has a plurality of first transmitters configured to produce first light signals, the first transmitters being disposed such that the first light signals are fed into end faces of the first tube segments facing the first transmitters.

11. The rotary transformer as claimed in claim 9, wherein the first light signals are fed in at a center of the end faces of the first tube segments facing the first transmitters.

12. The rotary transformer as claimed in claim 10, wherein the first light signals are fed in at a center of the end faces of the first tube segments facing the first transmitters.

13. The rotary transformer as claimed in claim 2, wherein the rotary transformer has a plurality of second transmitters configured to produce second light signals, the second transmitters being disposed such that the second light signals are fed into end faces of the second tube segments facing the second transmitters.

14. The rotary transformer as claimed in claim 13, wherein the second light signals are fed in at a center of the end faces of the second tube segments facing the second transmitters.

15. The rotary transformer as claimed in claim 1, further comprising:
 a splitter, wherein the first receiver is connected via the splitter to at least two adjacently disposed first tube segments.

16. The rotary transformer as claimed in claim 2, further comprising:
 a light-conducting splitter, wherein the second receiver is connected via the light-conducting splitter to end faces of at least two adjacently disposed second tube segments facing the receiver.

17. The rotary transformer as claimed in claim 1, wherein the first receiver is disposed in the region around a center of an end face of one of the first tube segments and/or the second receiver is disposed in the region around the center of the end face of one of the second tube segments.

18. The rotary transformer as claimed in claim 2, wherein the first receiver is disposed in the region around a center of an end face of one of the first tube segments and/or the second receiver is disposed in the region around the center of the end face of one of the second tube segments.

19. The rotary transformer as claimed in claim 1, wherein the first and/or second tube segments have a thin wall thickness.

20. The rotary transformer as claimed in claim 2, wherein the first and/or second tube segments have a thin wall thickness.

* * * * *